United States Patent
Breil et al.

[11] Patent Number: 5,397,514
[45] Date of Patent: Mar. 14, 1995

[54] PROCESS FOR PRODUCING FLAT AND ANNULAR-CROSS-SECTION EXTRUDATES AND DEVICE FOR IMPLEMENTING THE PROCESS

[75] Inventors: Jurgen Breil, Grabenstatt; Martin Haupt, Aachen, both of Germany

[73] Assignee: Bruckner Maschinenbau Gernot Bruckner GmbH & Co. KG, Siegsdorf, Germany

[21] Appl. No.: 81,279

[22] PCT Filed: Oct. 19, 1991

[86] PCT No.: PCT/EP91/01969
§ 371 Date: Jun. 25, 1993
§ 102(e) Date: Jun. 25, 1993

[87] PCT Pub. No.: WO92/07701
PCT Pub. Date: May 14, 1992

[30] Foreign Application Priority Data
Oct. 25, 1990 [DE] Germany .......... 40 33 974.2

[51] Int. Cl.⁶ .................................................. B29C 47/92
[52] U.S. Cl. ............................ 264/40.1; 264/40.5; 425/141; 425/162; 364/473
[58] Field of Search ............ 264/40.1, 40.6, 40.5; 425/141, 135, 162, 163; 364/473

[56] References Cited

U.S. PATENT DOCUMENTS

| | | | |
|---|---|---|---|
| 4,124,342 | 11/1978 | Akatsuka et al. | 425/141 |
| 4,711,747 | 12/1987 | Halter | 264/40.2 |
| 4,800,050 | 1/1989 | Hahn et al. | 264/40.1 |

FOREIGN PATENT DOCUMENTS

| | | |
|---|---|---|
| 023479 | 5/1986 | European Pat. Off. . |
| 0329157 | 8/1989 | European Pat. Off. . |
| 0357071 | 3/1990 | European Pat. Off. . |
| 3218421 | 11/1983 | Germany . |
| 3107701 | 12/1987 | Germany . |

*Primary Examiner*—Mathieu D. Vargot
*Attorney, Agent, or Firm*—Nixon & Vanderhye

[57] ABSTRACT

In prior art processes of this kind the actual thickness of the extrudate is measured, compared with a reference thickness and the setting regions of an extrusion plant are controlled dependent upon the degree of difference. In order nevertheless to improve the quality of the extrudate in relation to the desired reference thickness, according to the invention the evolution strategy process is used. An increase in the convergence rate can also be attained by taking into account strategy parameters which can be deterministically or stochastically changed, whereby mixing including fixedly settable strategy parameters is also possible. In particular, knowledge of the process can be involved as qualitative process partial knowledge.

18 Claims, 7 Drawing Sheets

PROCESS FOR PRODUCING FLAT AND ANNULAR-CROSS-SECTION EXTRUDATES AND DEVICE FOR IMPLEMENTING THE PROCESS

FIELD OF THE INVENTION

The invention relates to a process for producing flat and annular-cross-section extrudates, and to a device for implementing the process.

BACKGROUND OF THE INVENTION

One process for regulating the thickness of extruded flat sheets or plates of thermoplastic has been disclosed by DE 31 07 701 C2, for instance. In this process, measurement values are found during continuous measurement of the thickness of the flat sheet or plate using a thickness gauge transversely to the draw-off direction; these values are averaged, and control is carried out as a function of the ascertained deviation between the actual values and a specified command value.

This is a classical process of readjustment as a function of the ascertained differential signals between actual and command variables.

A similar method has also been disclosed by EP 0 203 479 A2. Once again, a specific mean value is formed via measurement value pickups, a command value is fixed, and after the deviation of the actual value from the command value has been found, the control device is altered to make a correction.

Although partial improvements are attainable with such processes and devices, it has nevertheless been found that particularly in a closed-loop control process that is dependent on a number of control parameters, the fastest possible optimization and subsequent stabilization of the attained optimal control can be achieved only with difficulty, particularly if the variation in the deviation is to be as slight as possible.

SUMMARY OF THE INVENTION

It is therefore the object of the present invention to create a process that is improved compared with the prior art and a device pertaining to it, as a result of which more-optimal control in view of a particular stated target is possible, particularly in the field of the production of flat and annular extrudates.

According to the invention, the object is attained with respect to extrusion processes and devices in accordance with an evolution strategy for optimization.

The present invention incorporates a completely novel approach wherein control is performed as a function of stated target, employing the method of evolution strategy.

In the method of evolution strategy, an at least partially and/or tendentially random variation in the control parameters, that is, the control variables, is carried out by means of the basic principles of "mutation" and "selection", so that after the varying quality standards have been checked, it can be ascertained from the subsequently performed "selection" whether a variation toward the desired optimization and an increase in quality in accordance with the standards as a result of the mutation can be ascertained. If an improvement is ascertained, then an improved set of parameters resulting from a "mutation" can be chosen as a point of departure for further improvement in the machine setting. That is, the mutation varies the machine setting via a random process, or substantially via a random process; within the context of the selection, the improved machine settings are selected as a point of departure for the next mutation step.

Evolution strategy per se is known in principle for optimizing industrial systems. In this respect, reference can be made purely as an example to the publications by I. Rechenberg, "Evolutionsstrategie, Optimierung technischer Systeme nach Prinzipien der Biologischen Evolution" [Evolution Strategy: Optimization of Industrial Systems by Principles of Biological Evolution], FromannoHolzborg, Stuttgart, 1973, and H. P. Schwefel, "Numerische Optimierung yon Computer Modelien" [Numerical Optimization of Computer Models], Birkhäuser, Basel and Stuttgart, 1977. However, these publications do not even hint at the idea that evolution strategy processes might also be employed in the production of flat and annular-cross-section extrudates in extrusion systems.

Yet employing evolution strategy precisely in this field creates surprising and unexpected advantages.

Evolution strategy is a parameter optimizing process that can be successfully employed in high-dimensional problems and multimodal target functions (functions with more than one secondary maximum), even under the influence of stochastic disturbances.

The following particular advantages of evolution strategy can be named:

Independence of Model

Most optimizing strategies requite a model of the target function.

Evolution strategy requires no model whatever, but can use a model and adapt it locally and adaptively to the actual target function.

Independence from Disturbance Variables

In evolution strategy, disturbance variables do not affect the certainty of convergence, but only the rate of convergence. In terms of operating point optimization, disturbances both in the process and in the measurement technique or in the actors can be compensated. As a result of this property, the strategy allows the use of even subjective evaluations of quality characteristics for optimization purposes.

Complexity

Evolution strategy permits optimizing task definitions of arbitrary dimensionality.

Restrictions and Targets of Optimizing

The restrictions and targets of optimizing can be freely defined.

According to the invention, the evolution strategy is controlled by strategy parameters that can be changed deterministically or stochastically. Advantages are also attained by a mixture of the deterministic or stochastic method, optionally taking fixedly set parameters into account as well.

In a further feature of the invention, to increase the rate of convergence, it proves particularly favorable to incorporate process knowledge into the evolution strategy, in the form of partial qualitative process knowledge.

Finally, it is also possible in evolution strategy to carry out an acceleration of convergence in optimizing the operating point. In doing so, however, it must be remembered that a high rate of convergence is diametrically opposed to a high certainty of convergence and that they cancel one another out. In most task definitions in operating point optimization, however, speed is the dominant criterion. The task is to improve the machine setting in the shortest possible time. If conversely the task definition is to find the best operating point in an arbitrary period of time, then the corresponding mechanisms of evolution must be used.

Hence the strategy can be adapted very accurately to the defined problem.

Process knowledge, either existing in fixed form beforehand or adaptively achieved during the process, can be employed in order to increase the convergence rate, for instance.

Finally, the convergence rate can also be increased, for instance in a physical process with decoupled subprocesses, by employing the method of evolution strategy separately upon each process in the sense of a parallel optimization. For instance, in producing a drawn film, it can be assumed that the film web will be evaluated in the draw-off direction along its middle plane of symmetry and has two decoupled subprocesses. This means that the thickness parameters on the right-hand film web are not affected by setting variables on the left-hand film web, and vice versa. Hence the evolution strategy method can be carried out separately for the two halves of the film web in the sense of parallel optimization.

Quite generally on the basis of these properties, evolution strategy can accordingly become a quality assurance building block, which performs on-line feedback of quality characteristics to the control variables.

The method employed is especially surprising in the case of regulating thickness in monoaxial or biaxial drawing systems for plastic films. This is because despite the nonlinear behavior of the film on the drafting path, by the process of the invention a correlation between the output variables, that is, the measured thickness profile, and the input variables, that is, the actuators at the extrusion nozzle, can be made during the crosswise and/or lengthwise drawing process. In the prior art, it is not possible to correctly associate individual film segments, located crosswise to the draw-off direction, with the associated control elements of the extrusion nozzle. By the evolution strategy method, however, despite the largely unknown correlation between the output variables and the control variables on the input side, equally optimized triggering of the actuators is assured by means of the randomly distributed search for an optimum.

Above all, in regulating the thickness in both monoaxial and biaxial drawing systems, the nonlinear behavior of the path is automatically taken into account in the process of the invention, so that a correct association of the foil segments to the associated control elements of the extrusion is made possible and the servo amplification is adapted constantly to the path amplification, the latter being dependent on the operating point.

This applies equally to the production of blown films, using ring nozzles with temperature-controllable tempering sectors, an adjustable inner mandrel, or a flexible outer ring as control elements for locally varying the thickness.

Finally, the process of the invention may also be achieved with thickness regulation in flat-film or coating systems, with a wide-slit tool in which the local melting temperature, the local outlet gap, or a restrictor bar in the flow channel transverse to the extrusion direction are adjusted.

BRIEF DESCRIPTION OF THE DRAWINGS

The invention will be described in further detail below, first in general and then in terms of specific exemplary embodiments. Individually, the drawings show.

DETAILED DESCRIPTION OF THE PREFERRED EMBODIMENTS

Figure 1:
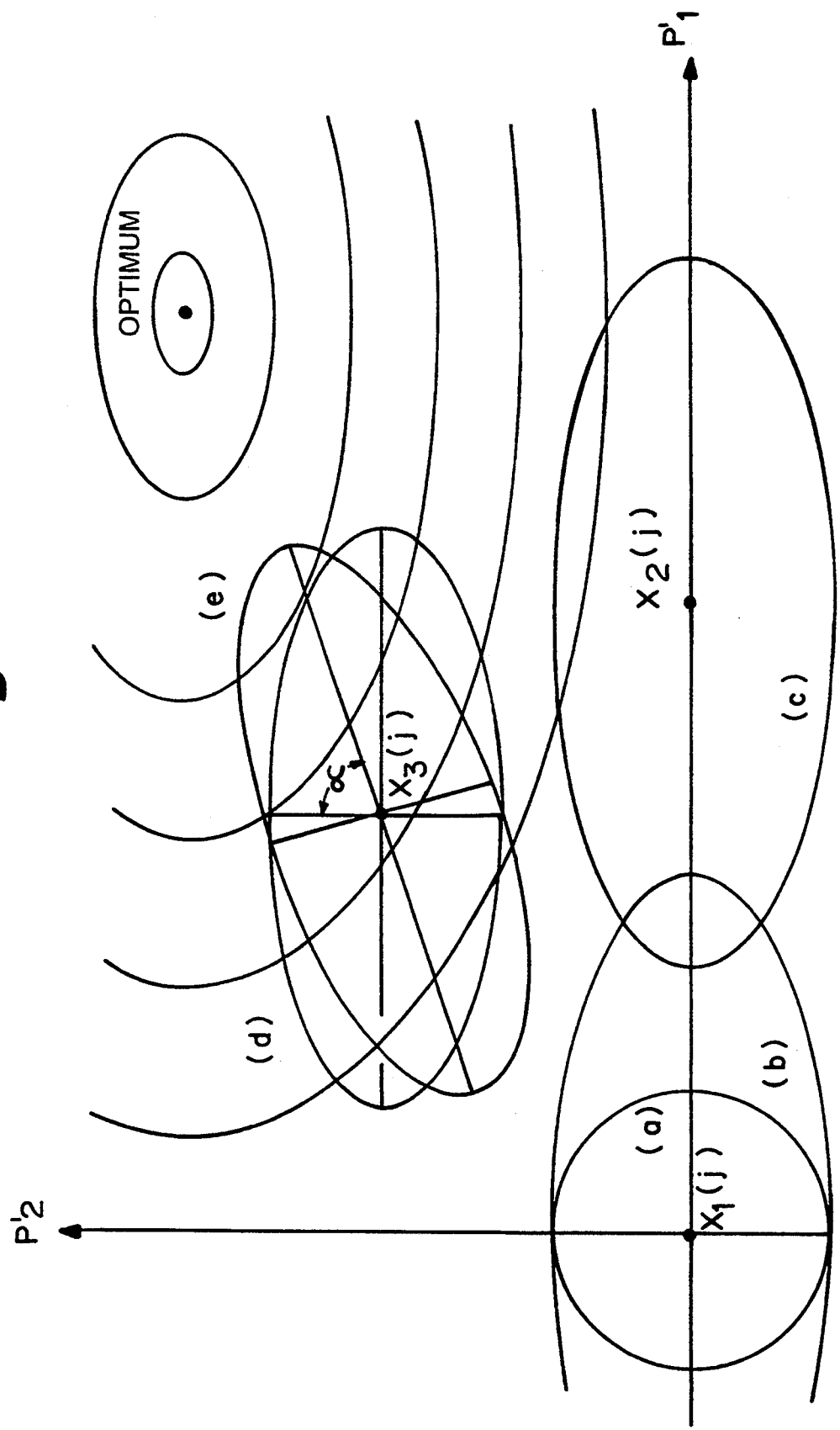
FIG. 1: an illustration of intervention options in the evolution strategy, particularly to increase the convergence rate.

When the evolution strategy is employed with industrial systems, the basic principles of "mutation" and "selection" can equally be taken as a point of departure. A parameter set recognized as valuable or improved for operational control is typically called a "parent", and a new parameter set or vector created by mutation is called an "offspring". If a specified parameter set, or a parameter set ascertained in a previous step, is assumed and if small changes are made in the sense of a small step width, then there is a greater likelihood of success in finding an improvement. Conversely, greater changes lead to a lower likelihood of success. This is taken into account by means of the distribution density of the random function.

One of the most common distribution density functions is standard distribution, whose form is determined by the variation or standard deviation.

In operating point optimization, the machine setting is accordingly varied by the mutation via a random process.

The selection includes the suppression rule, which evaluates whether a mutation will be recognized as valuable or not.

Disadvantageous mutations are rejected, while advantageous ones can lead to the generation of new offspring.

One way a simple selection scheme could look is that each offspring having top quality becomes a new parent. Beginning with the parent, further offspring are created, and so forth. In this way, the strategy shifts the parameter vector in such a way that the dependent variable (quality) becomes maximal.

Taking operating point optimization as an example, this accordingly means that the selection selects "valuable" machine settings, that is, machine settings that produce improved quality. Moreover, a plurality of parents used as the starting point of mutations are said to constitute a population. Particularly when secondary maximums in multimodal target functions (having a plurality of secondary maximums) are overcome, an exchange of information between different parents is possible in the context of recombination. For instance, the parameter vector, which serves as a starting point in the mutation of an offspring, is formed from more than one parent, via a partially random rule. This provides even greater certainty in the optimization.

Finally, in the sense of optimization even after a limited number of optimizing steps, parents can be eliminated, and/or "successful" parents can be rewarded by more-frequent mutations, for example.

Advantageous developments in each case can be reinforced by this means.

By corresponding incorporation of process knowledge, the convergence rate of the evolution strategy can be improved still further in on-line operating point optimization in processes that process plastics. Process knowledge begins in selecting the control variables and their definition range and is needed when choosing the output variables and forming the quality function.

Likewise, known relationships between input and output variables can fix a preferential direction of the strategy, for instance such that the mass throughput rises if the rpm increases. However, knowledge must be employed, not guesses, because knowledge promotes acceleration, while guesses or incorrect statements are counterproductive and slow down or hinder the optimization.

Some of the intervention options into the mutation, for speeding up convergence, are shown in FIG. 1.

In FIG. 1, the lines showing the altitude of a quality curve system are plotted above a two-dimensional parameter plane $P_1$ and $P_2$.

The ellipses are locations of equal probability of an offspring in the event of a mutation.

If the standard deviations from standard distribution are the same in both main axis directions, then the same probabilities are represented by a circle (case a). If the standard deviation for $P_1$ is greater than for $P_2$, then the circle changes into an ellipse (case b). By means of this unequal scaling, successes in optimization in the event of major variation of a parameter can be taken into account.

The scaling can then be determined by recombination or by deterministic process knowledge.

If successes are most probable in one particular axis direction, then the expectation value for the mutation can be shifted accordingly. The expectation value is the origin of the distribution density function of the random number. The expectation value shift is expressed as a shift in the entire ellipse in this axis direction (case c).

If the expectation value is shifted for all the parameters, then the origin of the ellipse can be positioned arbitrarily in space (case d).

In general, it cannot be expected that the local gradient of the target curve system will match a main axis direction. By means of variable metrics, the main axis of the ellipse can be rotated in the gradients (case e). This operation is a coordinate transformation, which can be learned by the evolution strategy by recombination, if the population is large, or it can be determined via deterministic process knowledge.

Process knowledge, particularly when it is qualitatively formulated, does not have the same validity for all operating states of the machine.

In general, the truth content is greater, the farther away the current operating point is from the optimal one. This statement naturally applies only as long as the machine is in an allowable operating field.

The unequal information content can be taken into account by means of variably incorporating process knowledge. When the machine is being started or set up, the knowledge is strongly taken into account, while in the vicinity of the optimum it no longer matters. This method presumes that an optimum vicinity can be defined. This prerequisite does exist for many quality characteristics in plastics processing.

Figure 3:
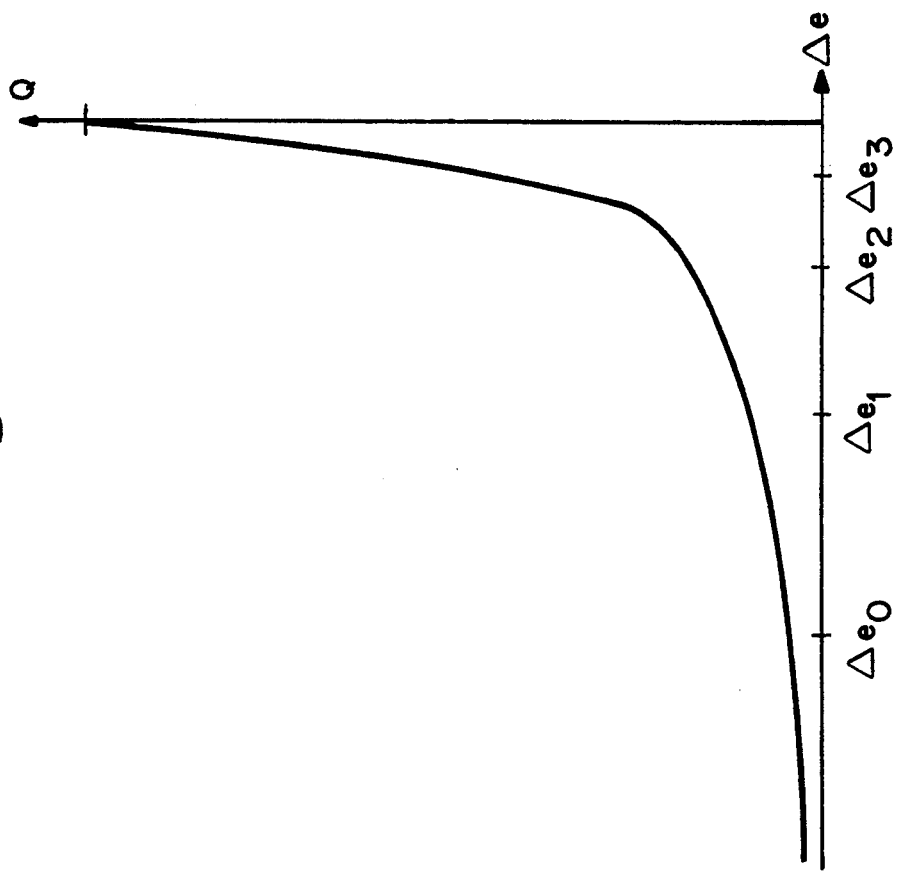
FIG. 3: an illustration to explain the increasing quality in subsequent mutation steps.
Figure 2:
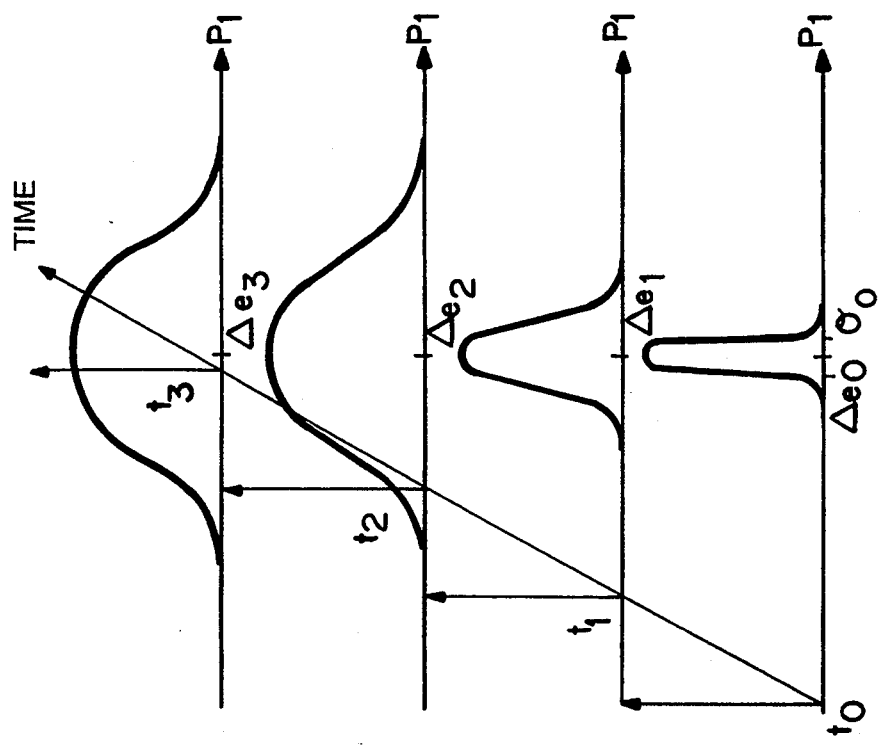
FIG. 2: an illustration with respect to the variable incorporation of adapted process knowledge, with shifting of expectations varied over time and with standard deviation.

In FIG. 2, the variable incorporation of process knowledge to determine the expectation shift and scaling of a parameter as a function of a quality characteristic is shown. Upon startup of the process (time $t_0$), the individual quality $Q_i$ has a low value (FIG. 3); that is, the individual quality is far from the optimal value. Where there is a great distance from the optimal value for the individual quality, the variable process knowledge produces a greater expectation shift delta $e_0$ for the setting variable $P_k$, which in FIG. 2 is expressed at time $t_0$ by the greater distance of delta $e_0$ from the zero point of the time axis. If the process knowledge is quantitatively known, then the standard deviation $\sigma$ can be set quite low. After all, the standard deviation $\sigma$ means that the variation in the random process is extremely slight, and in an extreme case can even be set to zero.

In this case, the optimization changes into so-called P control, that is, a proportional controller in which the control deviation is detected via a proportional memory corresponding to the process knowledge, and as a function thereof a change in the control variable is carried out. The expectation shift delta $e_0$ thus corresponds at the starting point to the P component of a P controller, given a "zero" variation.

If the knowledge is only qualitative, then the expectation value shift should be less than the standard deviation. The closer the machine setting approaches the optimum (production setting), the less is the expectation value shift taken into account. The incorporated process knowledge decreases continuously, and the strategy works without determinism. In FIG. 2, this transition is shown at time $t_1$, $t_2$ and $t_3$. Upon each further successive optimizing step from $t_0$–$t_3$, the distance of the expectation value shift delta $e_0$ from zero point of the time axis becomes less (its significance and contents thus decrease), and the standard deviation $\sigma$ assumes increasingly higher values, which means that the step width, which is within the standard deviation, gains increasingly greater significance as a function of chance.

As a result of this intervention option in evolution strategy, taking into account the variable process knowledge, the dimension of the optimizing task can in the final analysis be lessened by one order of magnitude; as a result, the rate of convergence rises in the final analysis. Purely for the sake of completeness, it is mentioned by the variable incorporation of process knowledge, the transition can be made continuous and carried out separately for each parameter, depending on knowledge. Quasi-individual adjusting variables can be regulated, while for others no restrictions are made whatever, from the very outset.

In the selection, the process knowledge is already put into the foreground, namely in selecting the suitable strategy.

Knowledge includes the suitable encoding of the task locations, step width control (in the event that scaling is not used or given higher priority), and the choice of the selection mechanisms.

The selection mechanism may also be changed during the optimization, however. Thus upon a setup, a strategy with one (surviving) parent and one offspring or one (dying) parent and 5 to 8 offspring is preferred. The step width control can be carried out by way of the 1/5 success rule, which states that in five attempts, at least one better point or value in the sense of program has been attained.

Process knowledge can be incorporated into the evolution strategy both in fixed for or in the form of adapted knowledge.

Fixed knowledge is defined by a dependency function of the input variable on the output variables, in the form of a equation $P_e=f(Q_j)$. In qualitative knowledge, the dependency function should be formulated "weakly" (small expectation shift, major scaling), while quantitative knowledge can be incorporated "strongly". Moreover, the validity range for the knowledge, which can also be described as a transition (function), must be fixed.

Adapted knowledge is learning about process relationships that is only acquired during the optimization. By a deterministic evaluation of the N-best operating points at the time, an individual adaptation of strategy parameters to the optimizing problem can be made.

The success rate, by Rechenberg's 1/5 rule, is a measure of the total step width. This rule states that in five attempts, at least one better point, that is, one point located closer to the optimum, must be present on average. If the average value deviates from this, then either the step width can be made greater (because the current parameter values is farther away from the optimum), or smaller (that is, if the current vector value is closer to the optimum). A great step width, then as noted, means a greater standard deviation, or in other words a random distribution of offspring with a greater step width spacing from an earlier parent.

Figure 4:
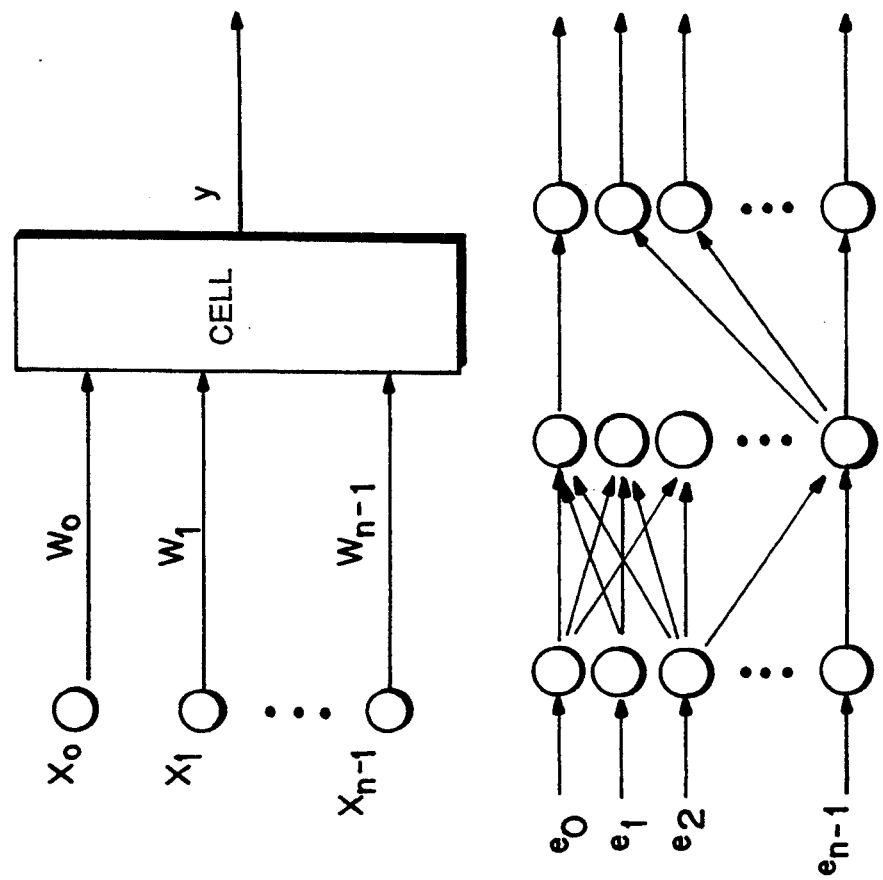
FIG. 4: a schematic illustration relating to the realization of a neural network.

FIG. 4 merely shows that the conversion of such a process can be done especially favorably only by using computers with neural networks.

The "nerve cell" has been represented by a processing element that has many inputs but only one output. The output signal is determined via a nonlinear function (such as a sigmoid function) from the weighted sum of input signals. The processing elements are connected to make networks, which are most organized in layers. FIG. 4 shows a three-layered "feed forward network", which comprises the input and output layers and the hidden layer.

The application of operating point optimization in a plastics processing process will be described in further detail below.

Figure 5:
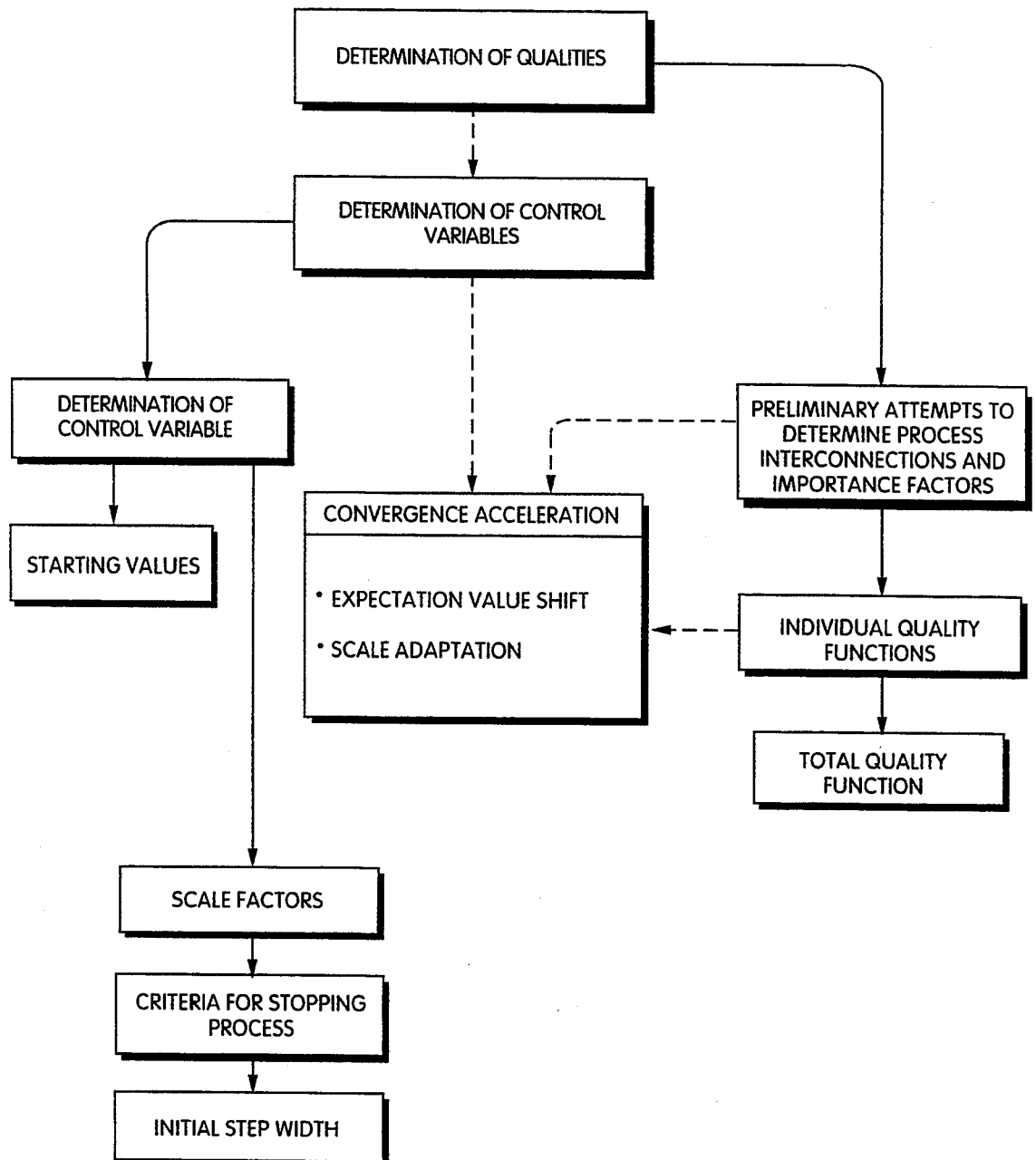
FIG. 5: a schematic overview on the adaptation of the optimizing strategy to a process for processing plastics.

Because of the great flexibility of the altered evolution strategy, the optimization must be adapted to the particular plastics processing process. To that end, the following steps must be performed:

Target definition
Determination of the individual parameters with peripheral conditions
Choice of strategy
Determination of starting conditions FIG. 5 shows the time-related dependency of the provisions.

Formulating the target function includes first the definition of the variables of production that are to be optimized. The output variables are the dependent variables of optimization and may be either process and product variables or production variables.

Above all, the quality characteristics of the output variables must be formed.

In the production of a biaxially drawn film, for instance, the variation in thickness should be minimized and the mean thickness value should be optimized.

Figure 6:
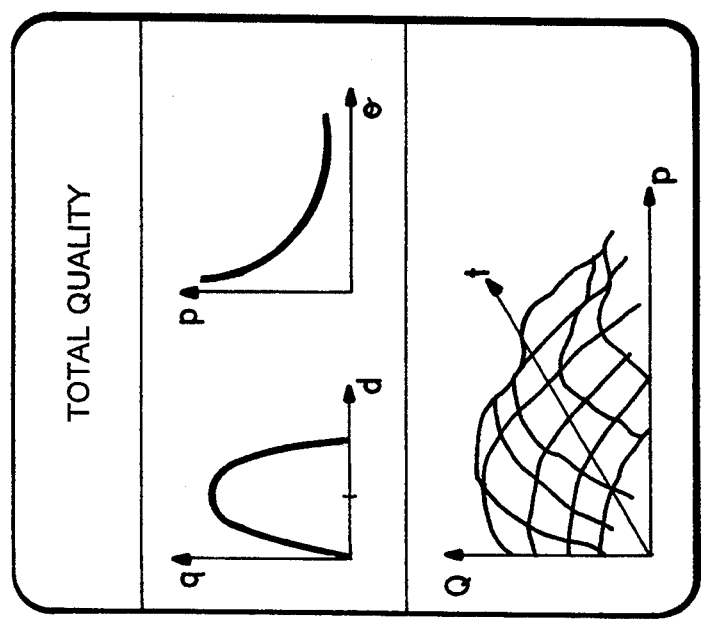
FIG. 6: the determination of the total quality, taking two individual qualities as an example.

By forming individual qualities, the various physical variables are standardized, taking requirements into account, so that individual qualities represent variables that are to be maximized. As shown in FIG. 6, the transformation is carried out via functions that should be continuously differentiatable.

In the third step, the individual qualities are combined into a total quality. The significance of the individual qualities is defined here. The simplest method is weighted adding. In this process, the priorities are defined by the weighting factors $a_i$.

$$Q_g=a_1*Q_2+\ldots+a_n*Q_n$$

Quite generally, it can be stated that the total quality function must represent the target of the optimization.

The linear total quality function, as given above, is not always useful. Particularly if there is one dominant quality characteristic, the optimization can be considered successful only if the characteristic is improved. This can be attained by multiplying the quality of the characteristic by the sum of the other individual qualities.

$$Q_g=a_1*Q_1*(K+a_2*Q_2+a_3*Q_3+\ldots a_n*Q_n)$$

Figure 7A:
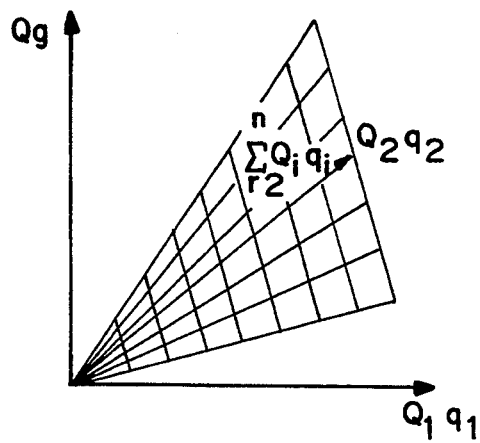
FIGS. 7a and 7b: two illustrations relating to different definitions of the total quality function.
Figure 7B:
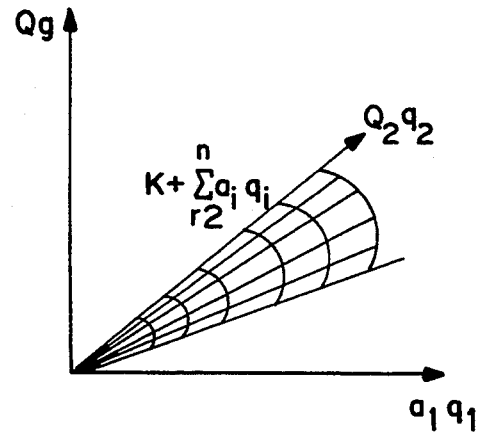

In FIGS. 7a and 7b, the course of the total quality function is shown for the various definitions. By the first definition, a plane is produced in space, and by the second, a curved contour is produced.

Measurement of the quality characteristics is usually done by suitable measurement principles and sensors for the physical variables.

Finally, however, even a subjective acquisition of the quality characteristics is possible. In principle, this can be considered equivalent to an objective acquisition of quality characteristics, but with superimposed disturbance variables. The disturbances may be either random or systematic. In evolution strategy, however, disturbances have no influence on the certainty of convergence but rather only on the convergence rate. These properties make it possible to use quality characteristics that can be acquired subjectively for operating point optimization.

Finally, a correlation may also exist between process variables and quality characteristics. Moreover, such correlation may be based on process knowledge or adapted knowledge if learned only during the optimization of the process. For instance, if the transfer function between one or more process variables and a quality characteristic resulting from them is known (for instance, the process variable of the gap width of the extruder lip in proportion to the measured thickness of the film), then the quality can be ascertained via the process variables. The transfer function may be determined either by analytical model forming or empirically (by correlation).

The control variables, finally, represent the independent variables of optimization in the overall process.

The evolution strategy will be explained below in conjunction with fiat film extrusion with biaxial drawing.

Figure 8:
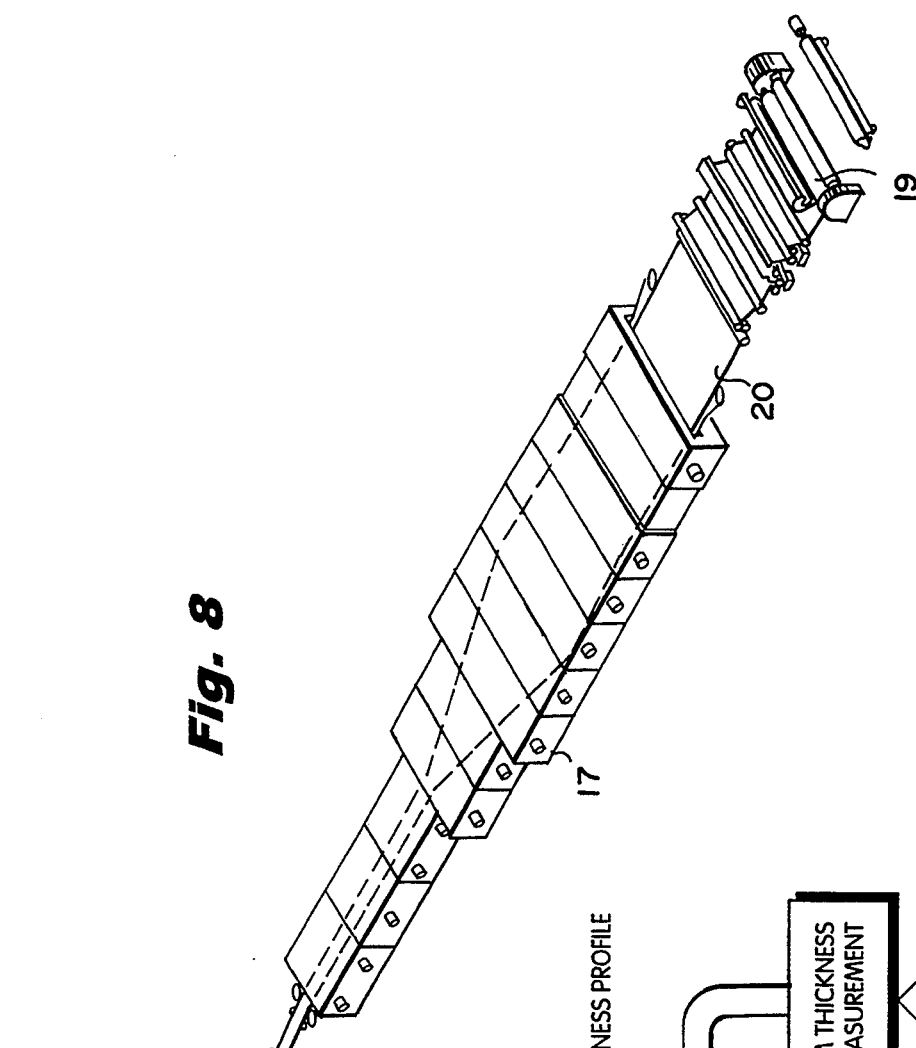
FIG. 8: a schematic overview of a flat film extrusion system with biaxial drawing.

FIG. 8 schematically shows a biaxial drawing device with an extruder 11, a first draw-off and cooling roller 13, following rollers 15 with a lengthwise drafting zone 16 located in this region, and a widthwise drafting machine 17 adjoining it.

In the widthwise drafting machine 17, the film 20 can be drafted in the crosswise direction, for instance by means of a revolving clip chain arrangement. After that, the edges are trimmed and the film is wound onto a winder 19.

Figure 9:
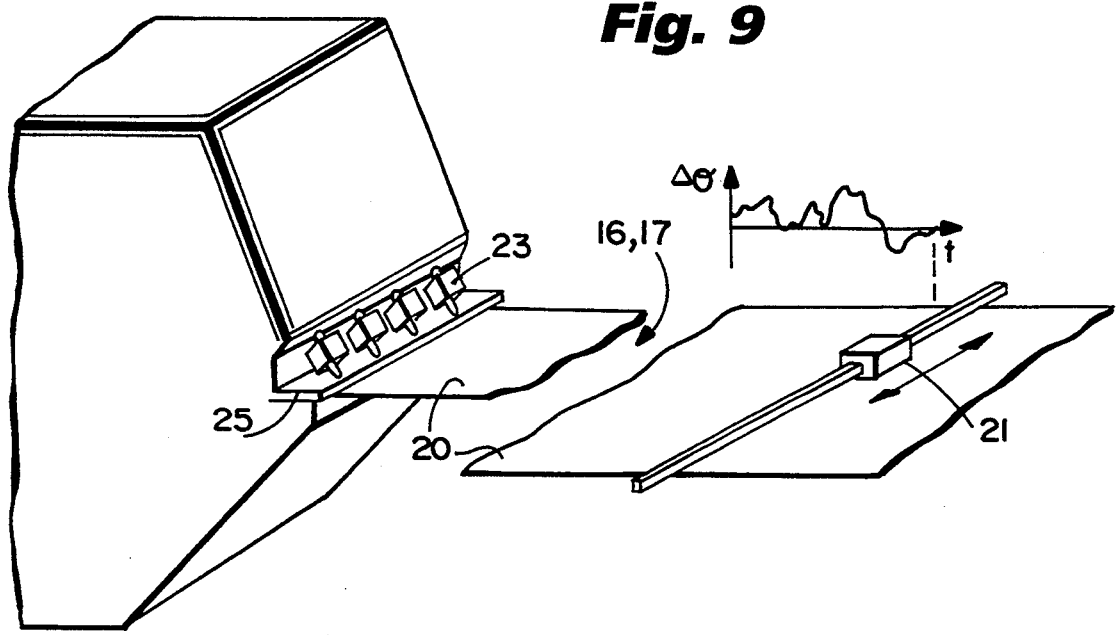
FIG. 9: a schematic fragmentary model illustration of a biaxial film drawing system with heat bolts for regulating the spacing of a tool lip on an extruder nozzle.

Following the widthwise drafting zone 17, a measuring head 21 that is movable crosswise to the draw-off direction is provided, as shown in FIG. 9 by means of which the thickness of the drawn foil can be measured. For cost reasons, a measuring head that is movable transversely to the draw-off direction across a great many measurement points is generally provided.

Biaxially drawn films may be extremely thin and may have a thickness of less than 1 $\mu$m. Such films can be used as capacitor films, as magnetic audio and video tape, or in the packaging industry, for instance.

The distribution of thickness over the film width is called the thickness profile. It can be affected by the nozzle contour of the wide slit tool.

The nozzle contour can in turn be influenced via thermal-expansion bolts 23, which are integrated into the tool and press against the nozzle lip 25, as shown in FIG. 9.

Hence the control variables to be optimized are the temperature/thermal-expansion bolts, while the thickness distribution of the film represents the target variable.

The drawing process is nonlinear. If the nozzle contour is adjusted such that at the outlet from the tool a constant thickness of film is present, then after the drawing the film has a thickness profile of nonconstant thickness. If the nozzle profile is changed at one point, then dictated by the mass constancy, the thickness profile of the entire film changes.

Hence the transfer performance of the drafting system cannot be described by proportional elements. In addition, such disturbance variables as convection or temperature gradients in the film also affect the drawing process.

Figure 10:
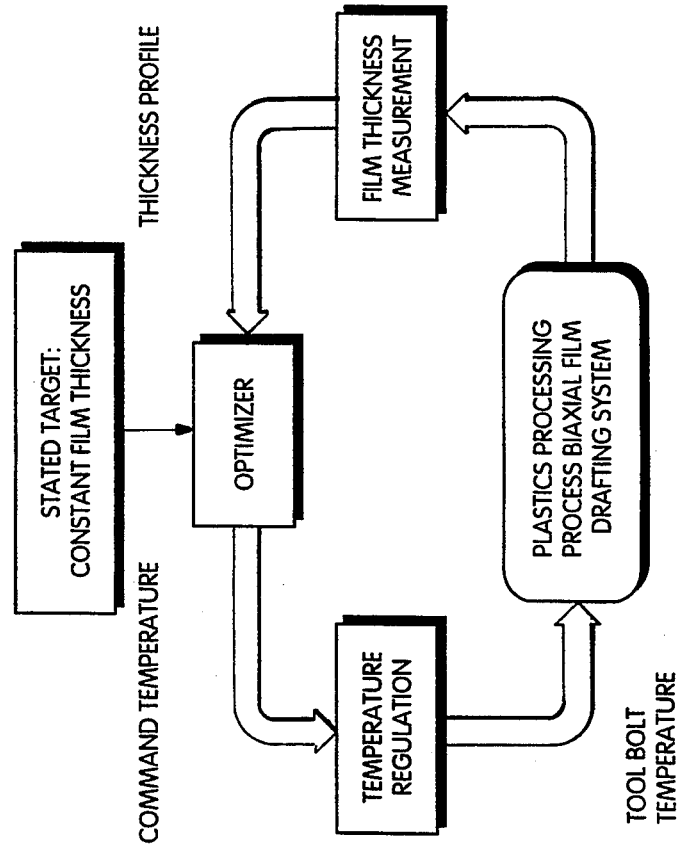
FIG. 10: a schematic illustration of the coupling of the optimizer system in a film drawing system.

In FIG. 10, the schematic relationships are shown in terms of the stated target of operating point optimization with respect to the film thickness; the twenty to thirty heat expansion bolts, for instance, in the extrusion nozzle can be adjusted as control variables, in the sense of twenty to thirty parameters, each of which is optimized by the method of evolution strategy.

The stated target of the optimization carried out can be formulated such that the extrusion and production of a film of constant thickness becomes possible over the entire width, even after a lengthwise and crosswise drafting process has been carried out.

The evolution strategy can be carried out with one parent or more than one offspring. The survival time of the parents may be limited. The process knowledge affects both the expectation value shift and the scale adaptation. The step width control can be carried out in accordance with the aforementioned 1/5 rule.

The deviation in thickness of the film is used as a quality characteristic.

To that end, the film is divided, for instance widthwise, into 50 zones, and for each zone the extent of variation in the thickness deviation is determined.

The total quality can be defined as the extent of variation of the film thickness over the entire width, calculated from the quality characteristics of the 50 film zones.

For the control variables of the optimization, that is, the tool bolt temperatures, two restrictions are operative, which are as a rule specified by the range of adjustment of the heat expansion bolts and the maximum mechanical load on the bending lip, for instance in the form of tool bolt temperatures 200° C.$<T_{bn}<$300° C.

$T_{bn}-T_{bn-1}<40°$ C.

starting values $T_{bn}=250°$ C. where N=1 ... 15

The increase in temperature of the heat expansion bolt causes a decrease in film thickness at a location that is not precisely known. This can be taken into account as process knowledge.

A trial run of the process will now be described:

The basic course of profile optimization is shown in FIG. 10. First, the set-point bolt temperatures are passed on to the temperature control system. The control adjusts the set-point temperatures in the process and keeps them constant. The process now produces a modified film with the changed nozzle setting. Once the idle process time has elapsed, which is determined by the draw-off speed and the film length between the tool and the thickness measuring head, the film thickness is measured and sent to a so-called optimizer 31. Via the quality function, the optimizer 31 calculates the quality of the setting and determines new bolt temperatures with the aid of the evolution strategy.

These set-point values are in turn passed to a control means 23, that is, a temperature control means 33, and as a result a new optimizing step is started.

Figure 11:
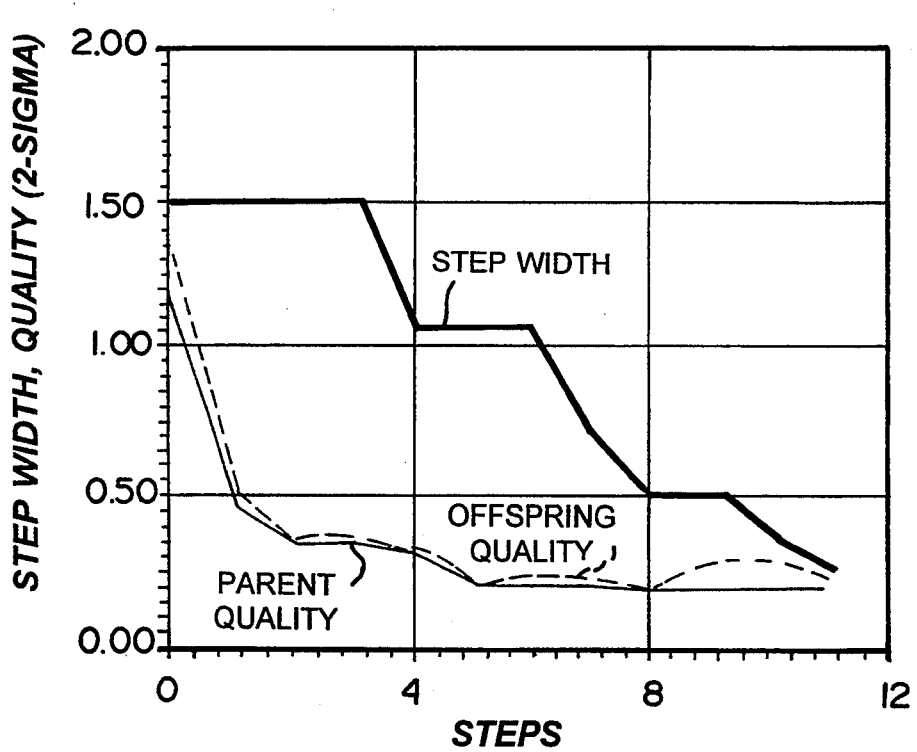
FIG. 11: a schematic illustration of the result of operating point optimization when a system is started up.

FIG. 11 shows the outcome by a trial carried out of the optimization upon startup of the extrusion line.

The extent of variation in film thickness and the step width of the optimization are plotted over the number of optimizing steps. The convergence in the variation in thickness from a starting value of 1.3 in step 0 up to a value of approximately 0.19 in step 8 can be clearly seen.

Figure 12:
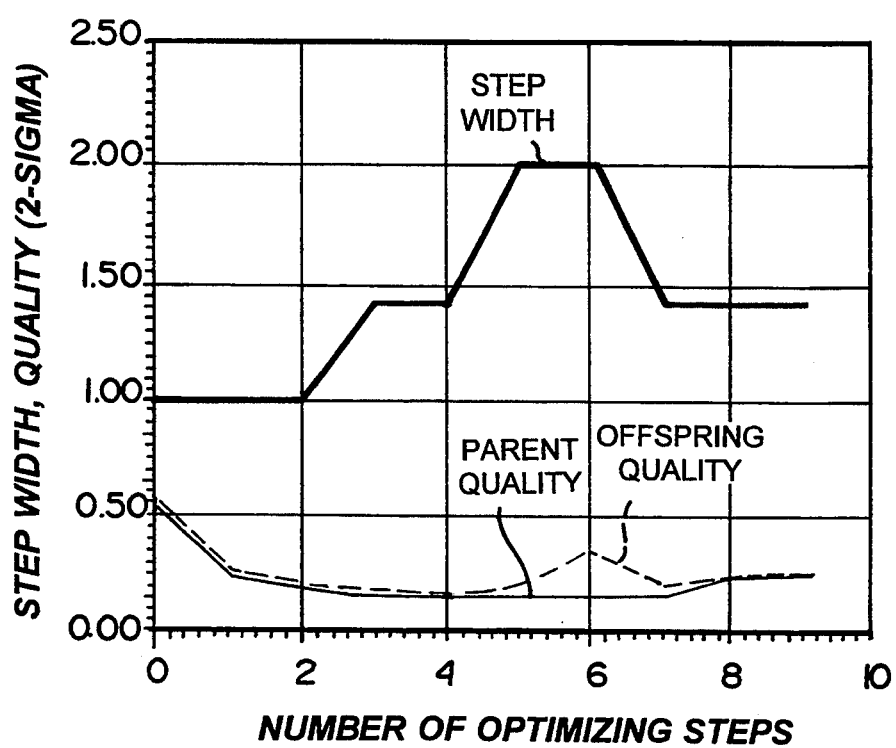
FIG. 12: the schematic illustration of the results of operating point optimization in order to explain a control variable compensation.

FIG. 12 shows the reaction of the optimization to a major disturbance in the process. To that end, in the widthwise drafting system half the tempering has been switched oft; and as a result the drafting performance has changed by 5 to 7%. The disturbance can be seen from a marked worsening in the extent of variation. FIG. 12 also shows that the influence of the disturbance is eliminated by the optimization after only a few steps.

Compared with deterministic control, the evolution strategy upon startup of the biaxial film drafting system is equally fast and in the final analysis is markedly better. The high convergence rate can be ascribed to the process knowledge incorporated. The optimization functions virtually as closed-loop control. In the region of the optimum the process knowledge is lessened, so that in further control steps, further improvement can be expected.

We claim:

1. A process for producing flat and annular-cross-section extrudates by means of an extrusion system, the extrusion system having an extrusion nozzle in the form of a wide slit or ring nozzle, and having a plurality of local adjustment zones located offset from a draw-off direction in which actuators are triggered for attaining an extrudate command thickness profile, and wherein the extrudate thickness is detected at positions located offset from the draw-off direction by means of a thickness gauge, said process comprising optimization of an extrudate thickness distribution carried out by minimizing the extrudate thickness deviation from a command thickness profile which is specified transversely to the draw-off direction by means of an evolution strategy method, in which in each case as a consequence of random changes (mutations) in control variables used in the context of a specifiable distribution density function (standard deviation), new control variables for final control elements included in said extrusion system, which affect the thickness distribution, are ascertained in the local control zones, [and]using a preselectable suppression rule (selection) in which a selection of control variables that are improved in view of a specified extrudate command thickness profile is made, triggering the final control elements in local control zones of the extrusion system, in order to carry out a following evolution step, and wherein the evolution strategy method is adapted to various production conditions or for increasing the convergence, in order to attain an optimized setting of the final control elements in a short time, said evolution strategy method using:

prior process knowledge in the form of a transfer function that reproduces a given dependency of output variables on the control variables, or automatic adaptive process knowledge about the transfer function between local influence on thickness and actually measured values of the extrudate thickness distribution or both said prior process knowledge and said automatic adaptive process knowledge.

2. The process of claim 1, wherein a suppression rule is used which represents a total quality function as a target of the specified extrudate command thickness profile as an optimum to be attained, the total quality function being composed of standardized individual qualities, each of which is formed by standardizing physical output variables corresponding to a stated target.

3. The process of claim 2, wherein total quality function $Q_g$ is formed by the method of weighted addition from individual qualities $Q_i$ and the weighting factors $a_i$, where $i = 1\text{-}n$, by the formula $$Q_g = a_1 {}^*Q_1 + a_2 {}^*Q_2 + \ldots + a_n {}^*Q_n.$$

4. The process of claim 2, wherein the total quality function $Q_g$ is formed from the individual qualities $Q_i$ with weighting factors $a_i$ where $i = 1\text{-}n$, and a further constant (K) in accordance with the equation:

$$Q_g = a_1 {}^*Q_1 {}^*(K + a_2 {}^*Q_2 + a_3 {}^*Q_3 + \ldots a_n {}^*Q_n).$$

5. The process of claim 1 wherein the distribution density function (standard deviation) and a step width control is varied upon each mutation as a function of the difference between the measured thickness distribution of the extrudate, measured crosswise to the draw-off direction, and the specified extrudate command thickness profile.

6. The process of claim 5, wherein as the difference between the measured thickness distribution of the extrudate and the specified extrudate command thickness profile crosswise to the draw-off direction decreases, the distribution density function (standard deviation) and a step width control is varied to smaller values.

7. The process of claim 1, wherein the evolution strategy method is applied so that at least one main axis direction of the distribution density function (standard deviation) is varied in an n-parameter space by scaling.

8. The process of claim 1, wherein the evolution strategy method is applied so that an expectation value shift for the origin distribution density function (standard deviation is carried out, which is equivalent to a shift in the origin of the distribution density function (standard deviation ) for the control variables randomly changed in the mutation.

9. The process of claim 1, wherein the evolution strategy is applied so that a coordinate transformation in an n-parameter space is carried out for aligning at least one scaled main axis with a local gradient, involving an extreme value, of a total quality curve system arrayed in the n-parameter space.

10. The process of claim 1, wherein the evolution strategy method applied using variable adaptive process knowledge is effected via a transfer function between control variables and output variables that exists when the extrusion system is started up, and wherein a corresponding control variable Pi is shifted with an adequately great expectation value shift, and at the same time the distribution density function (standard deviation) for this control variable Pi is set to a minimal value, and with an increasingly close approach to optimal control variables, the expectation value shift is adjusted toward zero and the standard deviation is adjusted toward an upper, preselectable limit value.

11. The process of claim 10, wherein the evolution strategy method is applied so that existing variable adaptive process knowledge is carried out by means of neural networks or simulated neural networks.

12. The process of claim 10, the evolution strategy method is applied so that existing variable adaptive process knowledge is carried out by means of statistical methods.

13. The process of claim 1, wherein with an increasing approach of control variables to optimal control variables., the distribution density function (standard deviation) is varied to increasingly smaller values.

14. The process of claim 1, further including at least quasi-decoupled subprocesses, wherein the method of evolution strategy is employed separately upon each subprocess.

15. The process of claim 1, wherein the process is employed for regulating thickness in monoaxial or biaxial drawing systems for plastic films.

16. The process of claim 1, wherein the process is employed in the production of blown films.

17. The process of claim 1, wherein the process is employed in flat-film or coating systems with a wide slit mechanism.

18. A device for carrying out the process of producing flat and annular cross section extrudates, the device including an extrusion nozzle embodied in the form of a wide-slit nozzle or ring nozzle, a plurality of local setting zones that are offset from a draw-off directions, said zones including actuators for attaining an extrudate command thickness profile, a thickness gauge, and an electronic control unit operated in accordance with an evolution strategy method for optimization of an extrudate thickness distribution for minimizing the extrudate deviation from a command thickness profile, said electronic control unit including means for operating in accordance with the evolution strategy method so that in each case as a consequence of random changes (mutations) in control variables used in the context of a specifiable distribution density function (standard deviation), new control variables for final control elements included in said device, which affect the thickness distribution, are ascertained in the local setting zones, using a preselectable suppression rule (selection) in which a selection of control variables that are improved in view of a specified extrudate command thickness profile is made and for triggering the final control elements in local setting zones of the extrusion system, in order to carry out a following evolution step, and wherein the evolution strategy method is adapted to various production conditions or for increasing the rate of convergence, in order to attain an optimized setting of the final control elements in a short time, said means operating said evolution strategy method using:

prior process knowledge in the form of a transfer function that reproduces a given dependency of output variables on the control variables, or automatic adaptive process knowledge about the transfer function between local influence on thickness and actually measured values of the extrudate thickness distribution or both said prior process knowledge and said automatic adaptive process knowledge.

* * * * *